United States Patent
Lee et al.

[11] Patent Number: 5,983,361
[45] Date of Patent: Nov. 9, 1999

[54] METHOD OF PREVENTION OF DANGLING TRANSACTION OCCURRENCE USING A TERMINATED TRANSACTION PROCESS TECHNIQUE AT REDO STEP

[75] Inventors: Jin Soo Lee; Jun Kim; Soon Young Park, all of Daejon-Shi; Young Chul Park, Daegu-Shi, all of Rep. of Korea

[73] Assignee: Electronics and Telecommunications Research Institute, Daejon-shi, Rep. of Korea

[21] Appl. No.: 08/974,330
[22] Filed: Nov. 19, 1997
[30] Foreign Application Priority Data Nov. 22, 1996 [KR] Rep. of Korea ...................... 96-56395

[51] Int. Cl.⁶ .................................................. G06F 11/14
[52] U.S. Cl. ................................. 714/19; 714/20
[58] Field of Search ................................. 714/19, 20, 16, 714/15; 707/202

[56] References Cited

U.S. PATENT DOCUMENTS

| | | |
|---|---|---|
| 5,280,611 | 1/1994 | Mohan et al. . |
| 5,333,303 | 7/1994 | Mohan ..................................... 395/575 |
| 5,455,946 | 10/1995 | Mohan et al. ........................... 395/600 |
| 5,524,205 | 6/1996 | Lomet et al. ....................... 395/182.14 |
| 5,649,185 | 7/1997 | Antognini et al. ...................... 395/609 |
| 5,850,508 | 12/1998 | Lee et al. ........................... 395/182.18 |
| 5,864,849 | 1/1999 | Bohannon et al. ......................... 707/8 |

Primary Examiner—Joseph E. Palys
Assistant Examiner—Omar A. Omar
Attorney, Agent, or Firm—Cohen, Pontani, Lieberman & Pavane

[57] ABSTRACT

The present invention relates to a recovery function from a system failure such as a power failure and a media failure such as a breakage of disk at a transaction processing system of a plurality of user environment, and is applied in carrying out a checkpoint to reduce an amount of work required for failure recovery, and particularly to a fuzzy checkpoint method which is a method of enhancing a system performance by not interrupting other transactions ever for a moment at the time of checkpoint. According to the present invention, the occurrance of dangling transaction is prevented by deleting the corresponding transaction entry from the transaction table during performing of the redo step, for the transactions terminated between the point of time when the checkpoint start log record of the last completed checkpoint is logged and the point of time when the checkpoint end log record is logged.

2 Claims, 4 Drawing Sheets

METHOD OF PREVENTION OF DANGLING TRANSACTION OCCURRENCE USING A TERMINATED TRANSACTION PROCESS TECHNIQUE AT REDO STEP

BACKGROUND OF THE INVENTION

1. Field of the Invention

The present invention relates to a method of prevention of dangling transaction occurrance using a terminated transaction process technique at redo step and, in particular, to a recovery function from a system failure such as a power failure and a media failure such as a disk crash at a transaction processing system of a plurality of user environment.

The present invention is applied in carrying out a checkpoint to reduce an amount of work required for failure recovery, and particularly to a checkpoint method, which is a method of enhancing a system performance by not interrupting other transactions even for a moment at the time of doing checkpoint.

2. Information Disclosure Statement

Among the conventional techniques which have been used in the present field, the transaction oriented checkpoint (TOC) method, transaction consistent checkpoint(TCC) method and action consistent checkpoint(ACC) method, etc. are methods in which while the checkpoints are carryied out, the performance of other transactions are interrupted, so they are excluded from consideration.

In a conventionally used fuzzy checkpoint method, errors are found that cancel a result of some transactions among already completed transactions, and these transactions are called dangling transactions. Error operation of this method will be described in detail below.

The fuzzy checkpoint is a method which asynchronously performs normal transactions and a checkpoint to improve the system performance. This method, first of all, records (logging) a checkpoint start log record at the time of carrying out the checkpoint, then finally records a checkpoint end log record after performing required operations, and updates/records master pages for supporting the recovery function there terminating the checkpoint process. The method checks a transaction table in the process of performing the checkpoint, collects the currently on-going (completion prepared state or completion not prepared state) transactions, writes the transactions on a transaction list of check point end log record, and logs the log record. If the check operation of transaction table is per formed without interleaving the normal transactions, the operation is precisely performed. However, in the fuzzy checkpoint, other cases can occur. For example, the performance of fuzzy checkpoint and the transaction T_i can cause interference as in a scenario shown below.

1. Checkpoint process logged the checkpoint start log record.
2. Checkpoint process checks the status of transaction T_i at transaction table, registers the transaction list, and thereafter checks the status of other transaction T_j.
3. Since a context switching occurs, a process which performs transation T_i is performed, and T_i logged the transaction end log record.
4. Checkpoint process resumes again, completes the checks of remaining entries at the transaction table to complete the checkpoint end log record, and records the log record to the log file.
5. Checkpoint process changes the pages.
6. Power failure occurred.

In the above example, the recovery function performance from the system failure(power failure) is as follows. First, at the analysis, log records are analysed from the checkpoint start log record of the last completed checkpoint, and if the transaction end log record of the transation T_i is encountered the item of T_i is removed from the transaction table. Thereafter, if the checkpoint end log record is encountered, the item of T_i is registered again on the transaction table in the condition of T_i(completion prepared condition or completion not prepared condition) written on the transaction list of the log record. The log record about the transaction T_i does not appear after the checkpoint end log record. Therefore, upon completion of the analysis step of recovery function, T_i is specified according to the status at the time when the checkpoint process checks the condition of T_i on the transaction table. T_i is specified as a transaction to be entirely rollbacked if the condition is completion not prepared condition, and as a completion prepared transaction if the condition is completion prepared condition. In case of being specified as a transaction to be entirely rollbacked, the transaction T_i is forcible aborted by undoing all undoable log records sequencially(in the order of opposite direction to the log)from the last log record of T_i which was checked at the time of performing the checkpoint at the undo step of recovery function. That is, the already terminated(completed or entirely rollbacked) transaction is cancelled from an intermediate state of the transaction or is made to be in completion prepared condition, therefore, the property of atomicity, consistency and durability of the transaction are not guaranteed. These transactions T_i are called dangling transactions, and an error exist that dangling transactions occur in conventional Fox checkpoint method.

SUMMARY OF THE INVENTION

Therefore, an object of the present invention is to provide a method of prevention of dangling transaction occurrance using a terminated transaction process technique at redo step to solve an error that dangling transactions occur in fuzzy checkpoint method which is a method of enhancing a system performance by not Interrupting other transactions even for a moment at the time of doing checkpoint which is cried out to reduce an amount of work required at the time of performing the recovery function from failure in the transaction processing system.

A method of prevention of dangling transaction occurrance using a terminated transaction process technique at redo step of the present invention to accomplish the above described object is characterized in deleting from the transaction table the transaction entry for transaction end log record between checkpoint start log record and checkpoint end log record of the last completed checkpoint among the log records recorded in the log file at the time of carrying out the redo step of recovery function.

BRIEF DESCRIPTION OF THE DRAWINGS

For fuller understanding of the nature and object of the invention, reference should be had to the following detailed description taken in conjunction with the accompanying drawings in which.

Similar reference characters refer to similar parts in the several views of the drawings.

DETAILED DESCRIPTION OF THE DRAWINGS

An embodiment of the present invention will be described below in detail with reference to the accompanying drawings.

Figure 1:
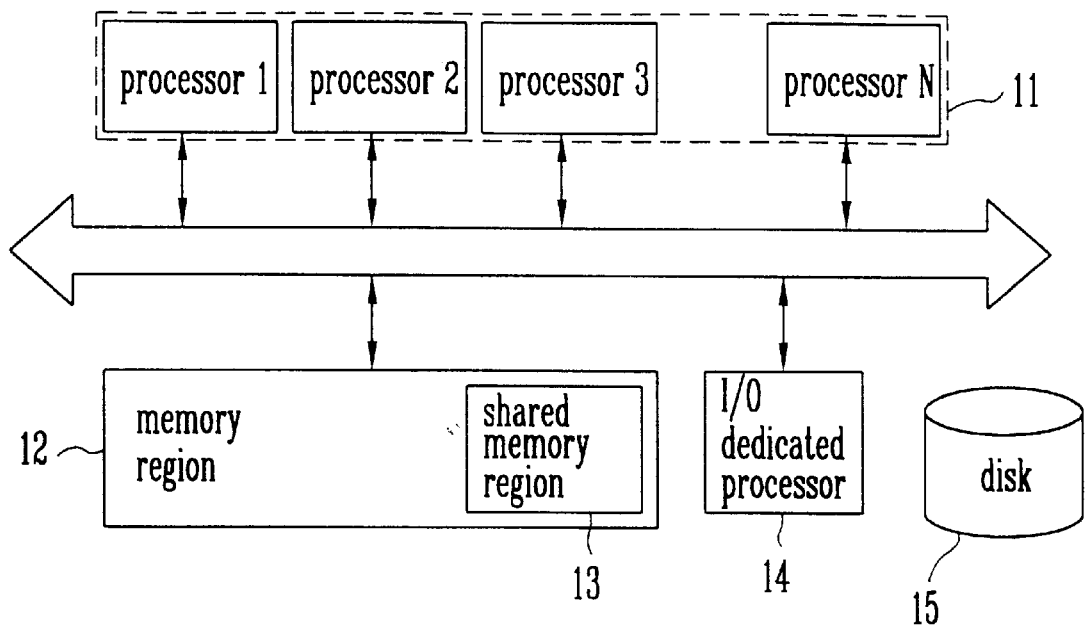
FIG. 1 is a structural drawing of a hardware to which the present invention is applied.

FIG. 1 is a structural drawing of a hardware to which the present invention is applied. In FIG. 1, $Pi(1<=i=n)(11)$ denotes a processor, Mem(12) denotes a memory region of a main memory device, SM(13) dentotes a shared memory region in the memory region 12, IOP(14) denotes an input/output dedicated processor, and DISK(15) denotes a disk which is an auxiliary memory device. As described above, the present invention can operate in a general hardware environment including a single processor or multi processor and a shared memory region.

Figure 2:
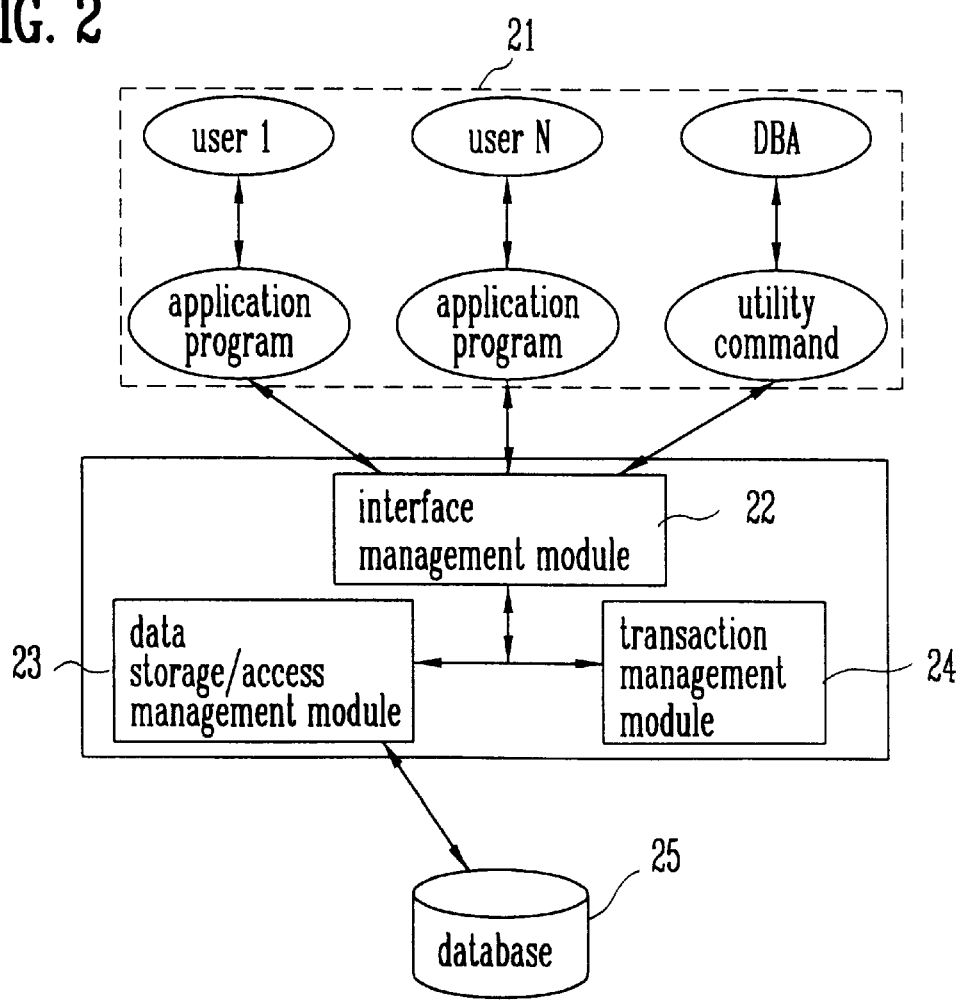
FIG. 2 is a structural drawing of a storage system module to which the present invention is applied.

FIG. 2 is a structural drawing of a transaction processing system module to which the present invention is applied. The module consists of an interface management module 22 which basically connects a user 21 and the system, a data storage/access management module 23 which generates and processes a database 25 in the disk, and a transaction management moule 24 which takes charge of concurrency control and recovery of transaction.

Figure 3:
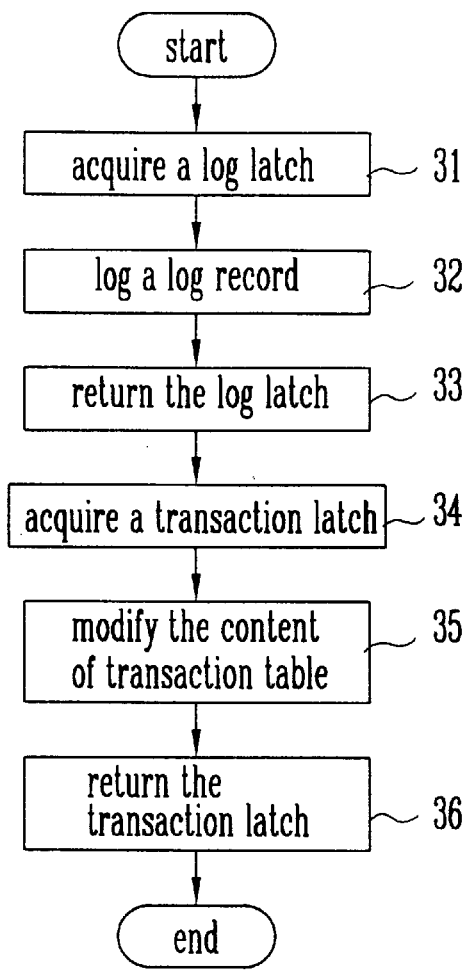
FIG. 3 is a flow diagram of logging operation of each transaction process in a transaction processing system to which the present invention is applied.

FIG. 3 shows only a logging operation part required for illustration of the present invention among the operation flow of transaction processes in the transaction processing system to which the present invention is applied. To record (log) the log record, a log latch which guarantees the integrity of this operation is acquired in exclusive mode at the step 31, logging is performed at step 32, the log latch is released(returned) at step 33. Thereafter, the result of this logging operation shall be reflected to a relevant portion of relevant entry of transaction table, and for this, first, a transaction latch which guarantees the integrity of the relevant reansaction table entry is acquired in an exclusive mode at step 34, portions which requires modification in the entry is modified at step 35, and the transaction latch is released(returned) at step 36.

Figure 4:
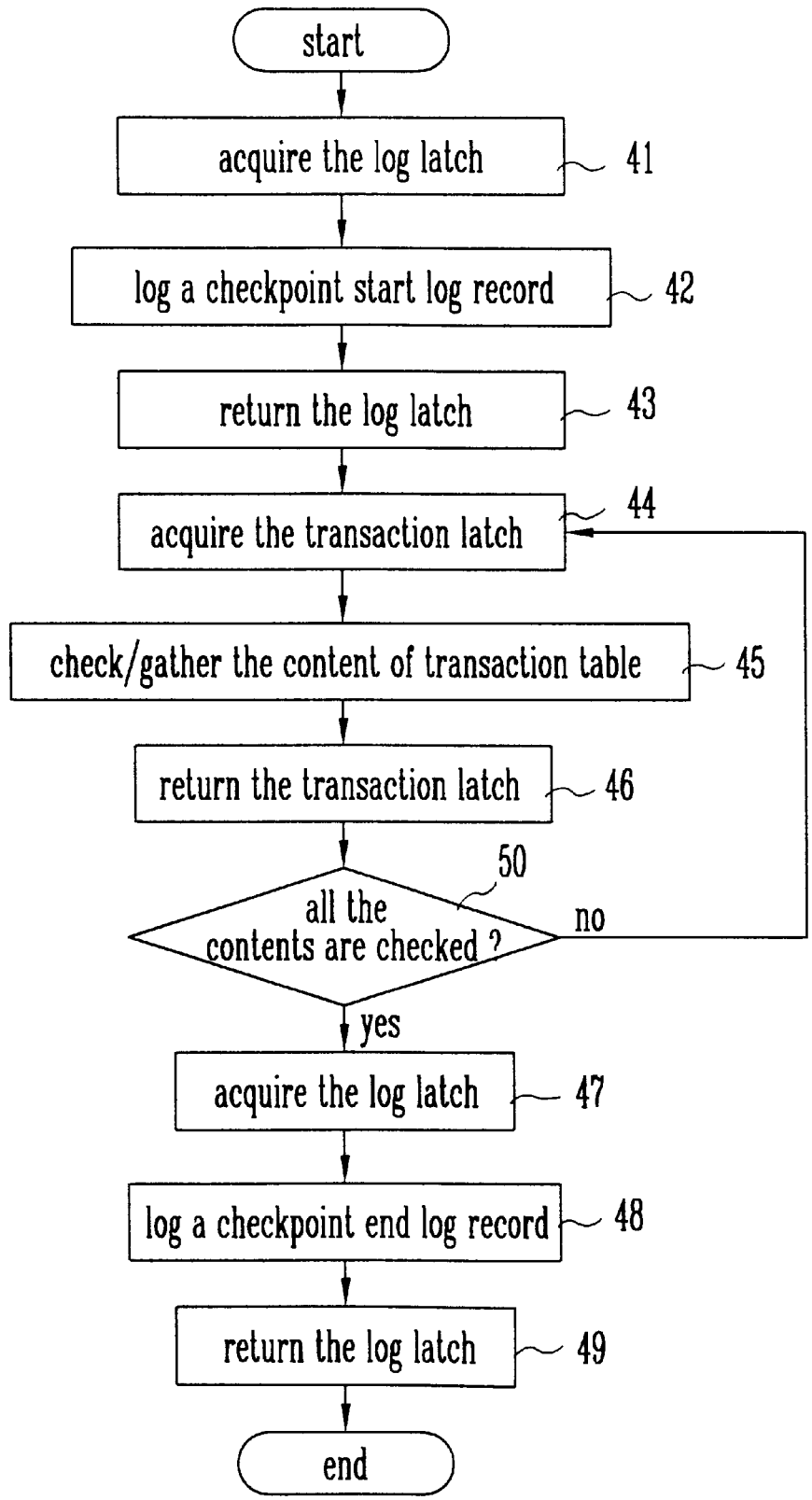
FIG. 4 is a flow diagram of a checkpoint process in the transaction processing system to which the present invention is applied.

FIG. 4 is a flow diagram of operation of a checkpoint process in the transaction processing system to which the present invention is applied. Only the portions required to illustrate the present invention are shown. The checkpoint first logs a checkpoint start log record, checks the content of transaction table and compile the necessary contents to make a teansaction list, and logs the transaction list by including it into a checkpoint end log record. When logging the checkpoint start log record, first, the log latch which guarantees the integrity of logging operation is acquired in exclusive mode at step 41, the checkpoint start log record is logged at step 42, and the log latch is released(returned) at step 43. The procedure of making the transaction list performs the followings for each entry of the transaction table. First, the transaction latch which guarantees the integrity of relevant transaction table entry is acquired in exclusive mode at step 44, thereafter, the content in the entry is checked and necessary portions are compiled and registered in the transaction list at step 45, and the transaction latch is released(returned) at step 46. If all entries of the transaction table is checked and the checking is completed at step 50, the completed transaction list shall be included in the checkpoint end log record and logged. For this, first the log latch which guaranteed the integrity of logging operation is acquired in exclusive mode at step 47, the checkpoint end log record is logged at step 48, and the log latch is released (returned) at step 49.

Figure 5:
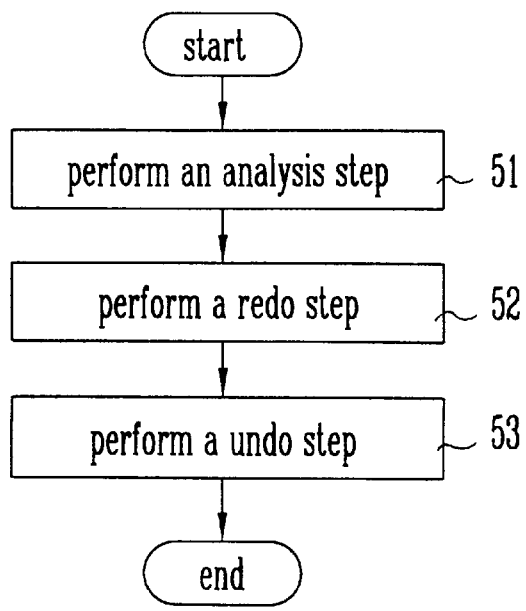
FIG. 5 is a flow diagram of operation of recovery function in the transaction processing system.

FIG. 5 is a flow diagram of the; operation of recovery function in the transaction processing system to which the present invention is applied. The recovery function is performed in three steps, that is, an analysis step 51, REDO step 52, and UNDO step 53 in that order.

The first step performs the analysis step at step 51. The operations performed at the analysis step are, first, to decide a point(log record) to start the REDO step which is the next step, second, to decide the transactions which shall be cancelled at the UNDO step which is the last step and to register the transactions to the transaction table. These operations will be described below in detail. The log records record in the log file are sequentially read from the checkpoint start log record of the last completed checkpoint to the end of the log records, and during this reading, for each log record, if the transaction table entry corresponding to the current log record does not exist, an entry is made at the transaction table, and if the current log record is the transaction end log record, the corresponding entry is removed from the transaction table.

The second step performs the redo step at step 52. An identifier(RedoLSN) of the log record to start the redo step is decided as the result of the analysis step which is the previous step. The identifier has a value smaller than or equall to LSN(=Begin__ChkptLSN) of the checkpoint start log record of the last completed checkpoint start log record of the last completed checkpoint. In the redo step, the log records recorded in the log file are sequentially read starting from the identifier (RedoLSN) to the end of the log records, and during this reading, if each log record is redoable type, a corresponding operation is redone.

The third step performs the undo step at step 53. At this step, the transactions still remaining in the transaction table are rolled back.

Figure 6:
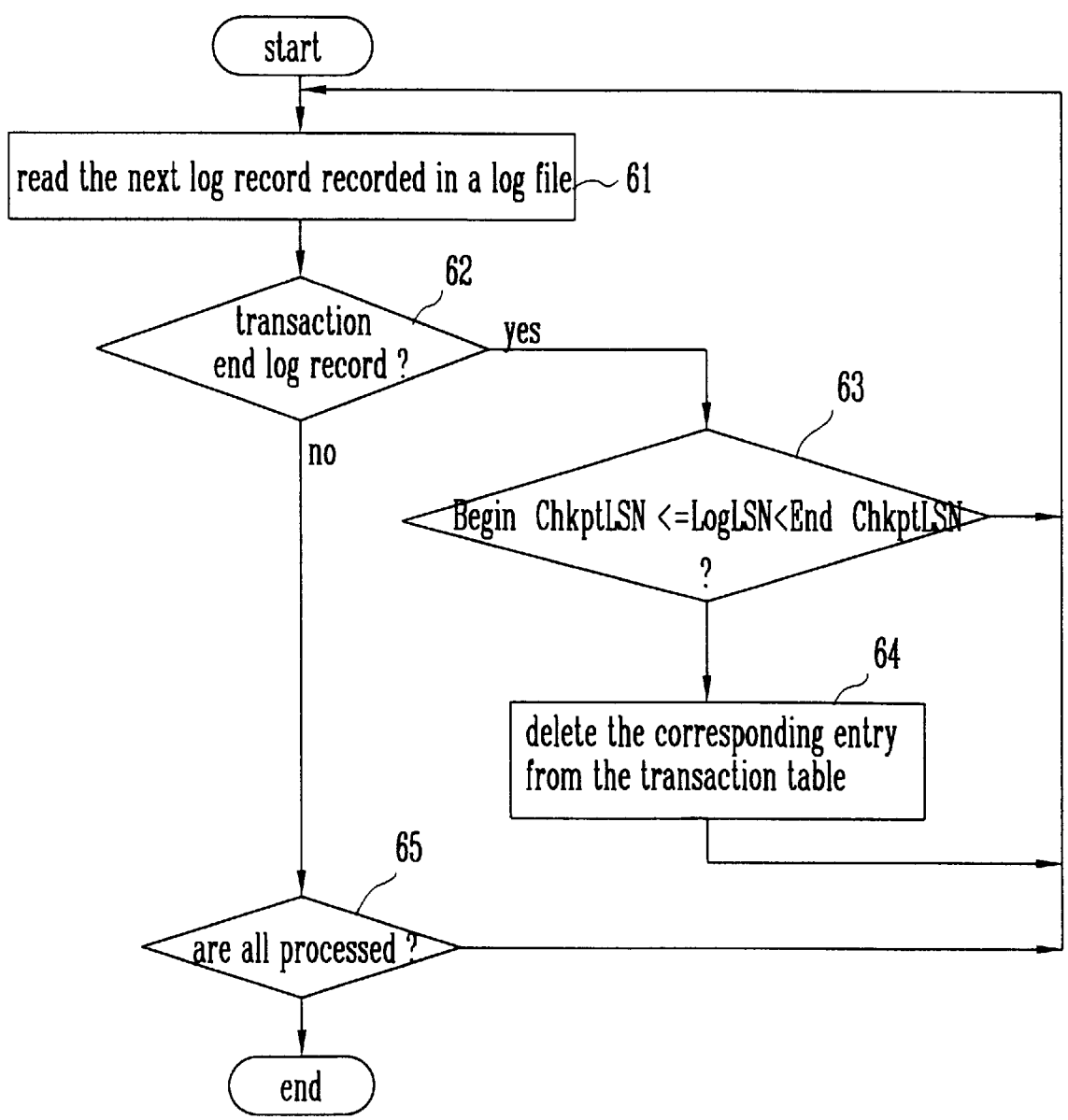
FIG. 6 is a flow diagram of operation at redo step of recovery function to which the present invention is applied.

FIG. 6 is a flow diagram of operation for redo step among the recovery function to which the present invention is used. Only the operation performed to remove the error that a dangling transaction occurs, which is a portion necessary for illustration of the present invention is described in detail. Other portions are same as the description of FIG. 5.

First step; if the analysis step is terminated, an identifier (RedoLSN) which starts the redo step is decided, where the identifier (RedoLSN) is smaller than or equal to the checkpoint start log record LSN(=Begin__ChkptLSN) of the last completed checkpoint.

Sequentially read the log records recorded in the log file starting from the identifier (RedoLSN) up to the end of log records(step 61), and confirm whether the current log record is the transaction end log record (step 62).

Second step; if the current log record is the transaction end log record as a result of the confirmation, confirm whether the LSN of the current log record is larger than or equal to Begin__ChkptLSN or is smaller than End__ChkptLSN(LSN of the checkpoint end log record)(step 63).

Third step; if, as the result of the confirmation, LSN of the current log record is larger than or equal to Begin__ChkptLSN and smaller than End__ChkptLSN (LSN of the checkpoint end log record), delete the entry corresponding to an identifier (Trans ID) of the current log record from the transaction table(step 64) and re-perform the steps from the first step to process the next log record, and otherwise, directly re-perform the steps from the first step to process the next log record.

Fourth step; If, in the first step, tie current log record is not the transaction end log record, confirm whether all the log records are processed (step 65), and if all the log records are not processed, re-perform the steps from the first step to process the next log record, and if all the log records are processed, directly terminate the process.

In the conventional fuzzy checkpoint method, since the already terminated(completed or entirely rollbacked) transaction is rolled back from the interim state of transaction or made to be in the completion prepared condition, there is the error that property of atomicity, consistency and durability are not guaranteed, however, the error that such dangling transactions occur is removed through the present invention.

Effect of the Invention

The present invention described above obtains the following effects.

1. The advantages of fuzz checkpoint method can be taken as they are. That is, the performance of transaction processing system can be enhanced by not interrupting other transactions even for a moment at the time of doing the checkpoint.
2. The dangling transaction which is the error occurring in the conventional fuzzy checkpoint method does not appear, so that the recovery from failure is precisely carried out by the fuzzy checkpoint method.

The foregoing description, although described in its preferred embodiment with a certain degree of particularity, is only illustrative of the principles of the present invention. It is to be understood that the present invention is not to be limited to the preferred embodiments disclosed and illustrated herein. Accordingly, all expedient variations that may be made within the scope and spirit of the present invention are to be encompased as further embodiments of the present invention.

What is claimed is:

1. A method for the prevention of a dangling transaction occurrance using a terminated transaction process technique at a redo step, comprising the steps of:

a. reading the next sequential one of log records recorded in a log file starting from an identifier RedoLSN up to an end the of log records, and determining whether a current log record is a transaction end log record;

b. determining whether an LSN of the current log record is larger than or equal to a Begin_ChkptLSN and is smaller than an LSN of a checkpoint end log record when the current log record is the transaction end log record in step a.;

c. deleting an entry corresponding to an identifier of the current log record from a transaction table and repeating steps a. to c. to process the next log record if the LSN of the current log record is larger than or equal to the Begin_ChkptLSN and smaller than the LSN of the checkpoint end log record in step b., and directly repeating steps a. through c. to process the next log record if the LSN of the current log record is smaller than the Begin_ChkptLSN or larger than or equal to the LSN of the checkpoint end log record in step b.; and d. determining whether all the log records are processed when the current log record is not the transaction end log in step a., and repeating steps a. through d. to process the next log record if all the log records are riot processed, and directly terminating the terminated transaction process if all the log records are processed.

2. The method of claim 1, wherein said transaction entries corresponding to the transactions terminated between the time when the checkpoint start log record of the last completed checkpoint is logged and the time when the checkpoint end log record is logged, to prevent the occurrence of the dangling transaction.

\* \* \* \* \*